(12) United States Patent
Yamamoto et al.

(10) Patent No.: US 9,108,507 B2
(45) Date of Patent: Aug. 18, 2015

(54) FUEL TANK AND METHOD OF MANUFACTURING THE SAME

(75) Inventors: Norihisa Yamamoto, Aichi (JP); Junya Kimoto, Obu (JP); Hirokazu Sugiura, Chiryu (JP)

(73) Assignee: AISAN KOGYO KABUSHIKI KAISHA, Obu-Shi, Aichi-Ken (JP)

( * ) Notice: Subject to any disclaimer, the term of this patent is extended or adjusted under 35 U.S.C. 154(b) by 79 days.

(21) Appl. No.: 13/885,989

(22) PCT Filed: Nov. 17, 2010

(86) PCT No.: PCT/JP2010/070454
§ 371 (c)(1),
(2), (4) Date: May 16, 2013

(87) PCT Pub. No.: WO2012/066647
PCT Pub. Date: May 24, 2012

(65) Prior Publication Data
US 2013/0233733 A1    Sep. 12, 2013

(51) Int. Cl.
*B60K 15/035* (2006.01)
*B60K 15/03* (2006.01)
*F02M 25/08* (2006.01)
*B60K 15/077* (2006.01)

(52) U.S. Cl.
CPC ..... *B60K 15/03504* (2013.01); *B60K 15/03177* (2013.01); *F02M 25/089* (2013.01);
(Continued)

(58) Field of Classification Search
CPC .......... B60K 15/03504; B60K 15/03177; B60K 2015/0777; B60K 2015/03514; B60K 2015/03467; F02M 25/089; F02M 25/0854
USPC .............. 220/562, 564, 581, 582, 586, 4.12, 220/4.13, 4.14, 553, 23.83; 123/519
See application file for complete search history.

(56) References Cited

U.S. PATENT DOCUMENTS 3,747,800 A * 7/1973 Viland .................... 220/723
5,355,861 A * 10/1994 Arai ....................... 123/519
(Continued)

FOREIGN PATENT DOCUMENTS

JP        1989170024 A      11/1989
JP        11240344 A         9/1999
(Continued)

OTHER PUBLICATIONS

PCT/JP2010/070454 International Search Report dated Feb. 22, 2011 (2 p.).

*Primary Examiner* — Robert J Hicks
*Assistant Examiner* — Kareen Rush
(74) *Attorney, Agent, or Firm* — Conley Rose, P.C.

(57) ABSTRACT

The present invention is to enable an adsorbent disposed in the vicinity of a tank port to be appropriately subjected to a purge when the adsorbent in a canister is subjected to the purge by air, thereby eliminating a non-desorption region of fuel vapor. In a fuel tank according to the present invention, a tank port (20t) that communicates with a space in a fuel tank body (10m), a purge port (20p), and an atmosphere port (20a) are formed in a container (21) of a canister (20) constituted by a container body (22) and a cover material (23), an inside of the container (21) of the canister (20) is configured to be partitioned to form passages (T1) and (T2) so that insides of the passages (T1) and (T2) are filled with an adsorbent (C), and the atmosphere port (20a) is provided on one end side in an air flow direction of the passages (T1) and (T2) and the tank port (20t) is provided on the other end side in the air flow direction of the passages (T1) and (T2) together with the purge port (20p).

8 Claims, 7 Drawing Sheets

(52) U.S. Cl.
CPC .. *F02M25/0854* (2013.01); *B60K 2015/03467* (2013.01); *B60K 2015/03514* (2013.01); *B60K 2015/0777* (2013.01)

(56) References Cited

U.S. PATENT DOCUMENTS

| | | | |
|---|---|---|---|
| 6,269,802 | B1 | 8/2001 | Denis et al. |
| 6,669,043 | B2 * | 12/2003 | Fish et al. .................... 220/4.14 |
| 8,235,028 | B2 * | 8/2012 | Hidano et al. ................ 123/519 |
| 2010/0126476 | A1 * | 5/2010 | Hidano et al. ................ 123/519 |

FOREIGN PATENT DOCUMENTS

| | | |
|---|---|---|
| JP | 2001063385 A | 3/2001 |
| JP | 2008168767 A | 7/2008 |
| JP | 2009083804 A | 4/2009 |
| JP | 2009127603 A | 6/2009 |
| JP | 2009250059 A | 10/2009 |
| JP | 2010221886 A | 10/2010 |

* cited by examiner

FUEL TANK AND METHOD OF MANUFACTURING THE SAME

TECHNICAL FIELD

The present invention relates to a fuel tank having a configuration in which a fuel tank body that stores fuel and a container body of a canister that stores an adsorbent to which fuel vapor is able to be adsorbed are integrally molded, and a method of manufacturing the same.

BACKGROUND ART

A technique related to the fuel tank described above is disclosed in JP-A-2008-168767.

Figure 8:
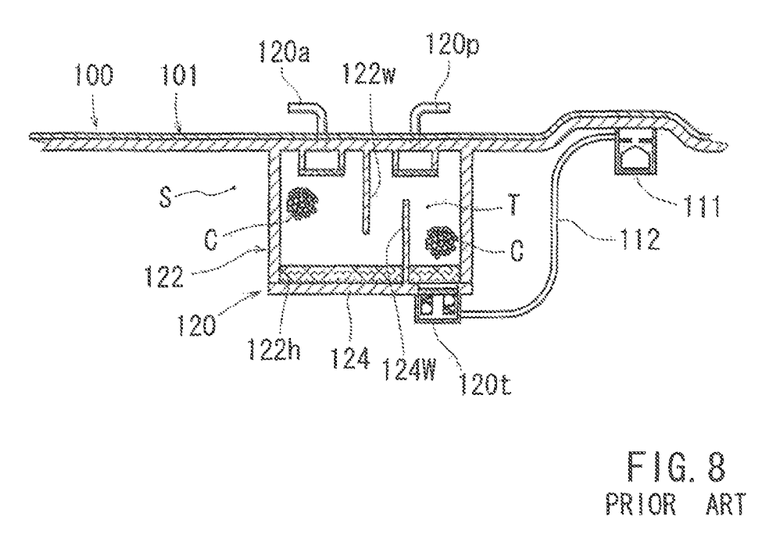
FIG. 8 is a longitudinal cross-sectional view illustrating a canister of a fuel tank according to the related art.

As illustrated in FIG. 8, a fuel tank body 100 of the fuel tank is configured by joining an upper shell 101 and a lower shell (illustration is omitted). A container body 122 of a canister 120 is molded integrally with the inner side of the upper shell 101 at the ceiling portion. In the container body 122 of the canister 120, an atmosphere port 120a and a purge port 120p are formed at positions of the ceiling portion of the upper shell 101, and an opening portion 122h is formed at the lower end position of the container body 122. In addition, the opening portion 122h of the container body 122 is configured to be closed by a cover material 124. A partition 122w that protrudes downward is formed at the ceiling portion of the container body 122, and the atmosphere port 120a and the purge port 120p are separated by the partition 122w to the left and the right. In addition, a vertical wall 124w that protrudes upward and is disposed parallel to the partition 122w of the container body 122 is provided in a cover material 124, and on the lower surface side of the cover material 124 positioned on the right of the vertical wall 124w, a tank port 120t including a bidirectional check valve is provided. That is, the inside of the container of the canister 120 is partitioned by the partition 122w and the vertical wall 124w and has a passage T formed to reach the purge port 120p and the tank port 120t from the atmosphere port 120a. In addition, the inside of the passage T of the canister 120 is filled with an adsorbent C to which fuel vapor is adsorbed.

During a stop of an engine, when the pressure in the fuel tank body 100 is increased due to a temperature rise or the like, air and the fuel vapor in the fuel tank body 100 flow into the canister 120 via a cut-off valve 111, a vapor passage 112, and the bidirectional check valve of the tank port 120t. In addition, the fuel vapor that flows in from the tank port 120t is adsorbed to the adsorbent C such that only the air diffuses to the outside from the atmosphere port 120a.

In addition, during driving of the engine, a negative pressure is applied to the purge port 120p that communicates with an intake passage (illustration is omitted) of the engine, air flows into the canister 120 from the atmosphere port 120a, the air flows in the passage T to cause the adsorbent C to be subjected to a purge, and thus the fuel vapor is desorbed from the adsorbent C. In addition, the fuel vapor desorbed from the adsorbent C and the air are supplied to the intake passage of the engine from the purge port 120p.

JP-A-2008-168767

SUMMARY OF INVENTION

Technical Problem

In the fuel tank described above, the atmosphere port 120a is positioned at the upstream end in the air flow direction of the passage T in the canister 120, and the tank port 120t is positioned at the downstream end in the air flow direction of the passage T. In addition, the purge port 120p is positioned at an intermediate position in the air flow direction of the passage T.

Therefore, during driving of the engine, air that flows in from the atmosphere port 120a flows between the atmosphere port 120 and the purge port 120p and rarely flows to the downstream side from the purge port 120p, that is, between the purge port 120p and the tank port 120t. As a result, the adsorbent C that fills the passage T between the purge port 120p and the tank port 120t cannot be appropriately purged, and thus a region in which the fuel vapor is not able to be desorbed from the adsorbent C is generated.

Accordingly, there has been a need for improved fuel tank in order, when an adsorbent in a canister is subjected to a purge by air in the canister having a container body molded integrally with a fuel tank, enable the adsorbent disposed in the vicinity of a tank port to be appropriately subjected to the purge, thereby eliminating a non-desorption region of fuel vapor.

BRIEF SUMMARY OF THE INVENTION

In a first aspect of this disclosure, a fuel tank has a configuration in which a fuel tank body that stores fuel and a container body of a canister that stores an adsorbent to which fuel vapor is able to be adsorbed are integrally molded, wherein, in a container of the canister constituted by the container body and a cover material, a tank port that communicates with a space in the fuel tank body, a purge port that is able to communicate with an intake passage of an engine, and an atmosphere port that is able to release atmosphere are formed, an inside of the container of the canister is configured to be partitioned to form passages so that insides of the passages are filled with the adsorbent, and the atmosphere port is provided on one end side in an air flow direction of the passages, and the tank port is provided on the other end side in the air flow direction of the passages together with the purge port.

According to the first aspect, the atmosphere port is provided on the one end side in the air flow direction of the passages formed in the container of the canister, and the tank port is provided on the other end side in the air flow direction of the passages together with the purge port. That is, the tank port is provided at the downstream end of the passages in the air flow direction together with the purge port.

Therefore, when a negative pressure of the intake passage is applied to the purge port due to operations of the engine and the air that flows into the container of the canister from the atmosphere port flows toward the other end side (the downstream end) from the one end side (the upstream end) of the passages, the air also flows to the vicinity of the tank port. As a result, the adsorbent disposed in the vicinity of the tank port is also appropriately subjected to a purge, thereby eliminating a non-desorption region of fuel vapor in the canister.

According to a second aspect of this disclosure, the atmosphere port, the tank port, and the purge port are disposed inside the fuel tank body.

According to a third aspect of this disclosure, the atmosphere port, the tank port, and the purge port are disposed outside the fuel tank body.

According to a fourth aspect of this disclosure, the container body of the canister is formed to traverse the space in the fuel tank body, and a wall portion provided with the atmosphere port and a wall portion provided with the tank port and the purge port oppose each other with the fuel tank body interposed therebetween.

Therefore, for example, it is possible to reinforce the fuel tank body from the inside by using the container body of the canister.

According to a fifth aspect of this disclosure, a vapor passage that causes the tank port of the canister and the space in the fuel tank body to communicate with each other is constituted by a wall surface of the fuel tank body and a cover member that covers the wall surface.

Therefore, it is possible to mold the vapor passage integrally with the fuel tank body.

According to a sixth aspect of this disclosure, the container of the canister is constituted by a groove-shaped container body formed on an upper surface of the fuel tank body and a cover material that blocks the groove-shaped container body, one end side and the other end side in a longitudinal direction of the groove-shaped container body respectively correspond to the one end side and the other end side in the air flow direction of the passages, an elastic body that presses the adsorbent is disposed between the adsorbent that fills the container body and the cover material, and a ventilation resistance of the elastic body is set to be greater than a ventilation resistance of an aggregated part of the adsorbent.

Therefore, when the adsorbent is subjected to the purge by air, the air does not flow along the elastic body and appropriately flows along the aggregated part of the adsorbent. Accordingly, even when the length dimension of the groove-shaped container body is large, the adsorbent may be appropriately subjected to the purge, and the depth dimension of the container body may be reduced by an increase in the length dimension. Therefore, the dimensions of the canister protruding toward the internal space of the fuel tank body may be reduced.

According to a seventh aspect of this disclosure, a step of integrally molding any one of an upper shell and a lower shell that constitute the fuel tank body, and the container body of the canister; a step of integrally molding the other of the upper shell and the lower shell, and the cover material of the container body of the canister; a filling step of filling the container body of the canister with the adsorbent of fuel vapor; and a step of joining the upper shell to lower shell after the filling step, and joining the container body of the canister to the cover material are included.

Therefore, molding of the fuel tank body and molding of the canister may be simultaneously performed.

Advantageous Effects of Invention

According to these aspects, when the adsorbent in the canister is subjected to a purge, the adsorbent disposed in the vicinity of the tank port is also able to be appropriately subjected to the purge, thereby eliminating a non-desorption region of fuel vapor in the canister.

BRIEF DESCRIPTION OF DRAWINGS

FIG. 6 is a longitudinal cross-sectional view illustrating the configuration of a canister of the fuel tank according to Embodiment 3.

DESCRIPTION OF EMBODIMENTS

Embodiment 1

Hereinafter, description of a fuel tank according to Embodiment 1 of the present invention will be provided on the basis of FIGS. 1A to 3C. The fuel tank according to this embodiment is a fuel tank with a canister used in a vehicle.
<Summary of Fuel Tank 10>

Figure 1A:
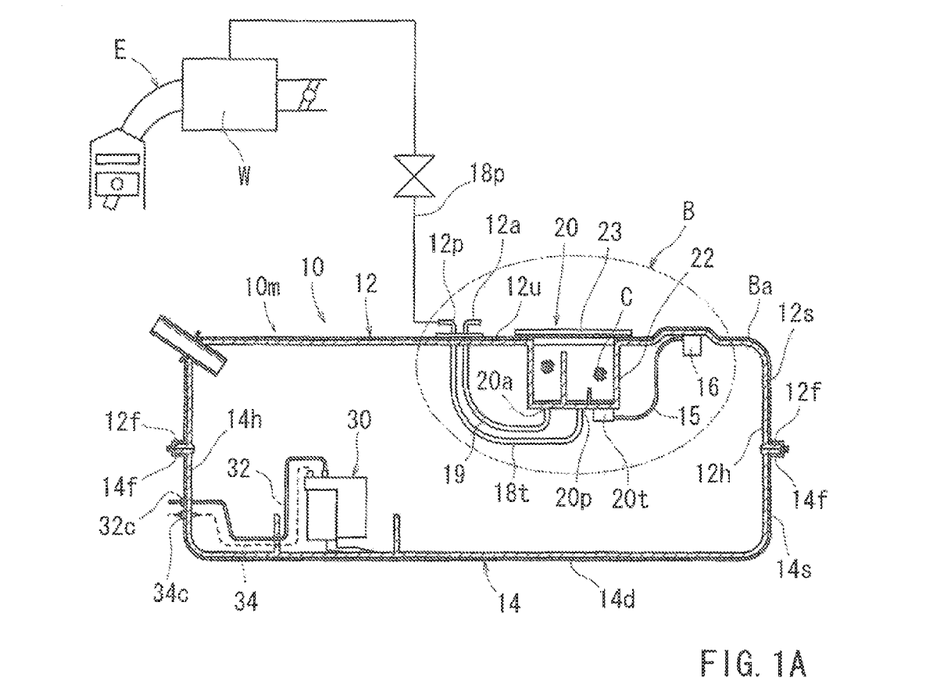
FIG. 1A illustrates a schematic diagram illustrating the configuration of a fuel tank according to Embodiment 1 of the present invention.
Figure 1B:
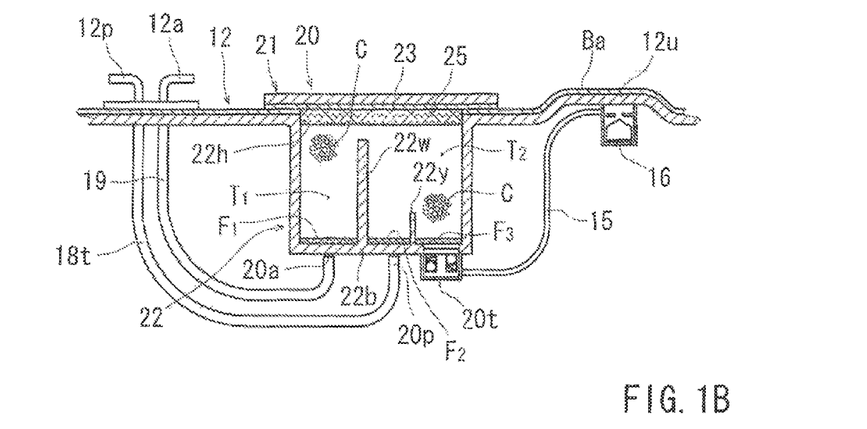
FIG. 1B illustrates an enlarged diagram of B part in FIG. 1.

As illustrated in FIG. 1A, a fuel tank 10 includes a tank body 10m constituted by an upper shell 12 and a lower shell 14. The upper shell 12 and the lower shell 14 are resin injection-molded products, and the surfaces thereof are covered with a barrier layer Ba having fuel permeation resistance. Here, as a resin that is a body material of the upper shell 12 and the lower shell 14, for example, high-density polyethylene (HDPE) is used, and as a material of the barrier layer Ba, an ethylene vinyl alcohol copolymer (EVOH) is used. In addition, in FIGS. 2A to 4B and FIG. 7A to 7C, the barrier layer Ba of the fuel tank body 10m is omitted.

The upper shell 12 is formed by an upper plate portion 12u and a side plate portion 12s in a square container shape in which the lower side thereof is open, and a flange portion 12f is formed at the peripheral edge of a lower side opening 12h. In addition, a container body 22 of a canister 20 described later is integrally molded at a predetermined position of the upper plate portion 12u of the upper shell 12.

As illustrated in FIG. 1A, the lower shell 14 is formed by a bottom plate portion 14d and a side plate portion 14s in a square container shape in which the upper side thereof is open, and a flange portion 14f is formed at the peripheral edge of an upper side opening 14h. A fuel pump unit 30 constituted by a fuel pump for pressure-feeding fuel to an internal combustion engine E, a pressure control mechanism, a sub-tank, and the like is mounted onto the bottom plate portion 14d (bottom surface) of the lower shell 14. In addition, a pipe connection portion 32c of a fuel pipe 32 of the fuel pump unit 30, and a connector 34c of an electrical cable 34 of the fuel pump unit 30 are fixed to the side plate portion 14s of the lower shell 14.

In addition, the flange portion 14f of the lower shell 14 and the flange portion 12f of the upper shell 12 are joined to each other, thereby forming the fuel tank body 10m.
<Canister 20>

The canister 20 is configured to enable adsorption of fuel vapor which is generated in the fuel tank body 10m during parking of a vehicle (an engine stopped state) and enable the adsorbed fuel vapor to be supplied to an intake pipe W of the engine E during driving. As illustrated in FIG. 1(14 the canister 20 includes a sealed type container 21, and the container 21 is constituted by the container body 22 of an upside open type and a cover material 23 that blocks an upper portion opening 22h of the container body 22.

The container body 22 is formed in a square convex shape at a predetermined position of the upper plate portion 12u of the upper shell 12, and as described above, is molded integrally with the upper shell 12. A partition 22w is formed in a fence shape at a position of the upper surface of the lower plate portion 22b (bottom surface) in the container body 22, and the inside of the container body 22 is partitioned by the partition 22w to the left and the right excluding the vicinity of the upper portion opening 22h as illustrated in FIG. 1B. That is, in the container body 22, a left passage T1 and a right passage T2 that communicate with each other at the upper portion are provided. In addition, the lower portion of the right passage T2 of the container body 22 is divided to the left and the right by a low vertical wall 22y formed to be parallel to the partition 22w.

In the bottom plate portion 22b of the container body 22, an atmosphere port 20a, a purge port 20p, and a tank port 20t including a bidirectional check valve are formed to protrude downward (to protrude toward the internal space of the fuel tank 10). That is, the atmosphere port 20a, the purge port 20p, and the tank port 20t are disposed on the inside of the fuel tank body 10m.

The bidirectional check valve of the tank port 20t is a valve for suppressing a change in the internal pressure caused by expansion and contraction of the fuel tank body 10m due to a temperature change and the like, and is opened when the pressure in the fuel tank body 10m is increased to a predetermined pressure or higher, or when the pressure in the fuel tank body 10m is reduced to a predetermined negative pressure or less.

Here, the atmosphere port 20a communicates with the left passage T1 of the container body 22 via a first filter F1, and the purge port 20p communicates with the left of the vertical wall 22y in the right passage T2 of the container body 22 via a second filter F2. In addition, the tank port 20t communicates with the right of the vertical wall 22y in the right passage T2 of the container body 22 via a third filter F3.

The left passage T1 and the right passage T2 of the container body 22 are filled with an adsorbent C made of granular activated carbon or the like from the upper portion opening 22h of the container body 22. In addition, in a state where the adsorbent C is filled in the container body 22, the entire upper surface of an aggregated part of the adsorbent C is covered with a plate-like elastic body 25 (for example, urethane, rubber, or the like). Next, the cover material 23 covers the elastic body 25 to press the elastic body 25, and the peripheral edge of the cover material 23 is joined to the peripheral edge of the upper portion opening 22h of the container body 22. Here, the elastic body 25 is elastically deformed by being pressed by the cover material 23 and thus the aggregation part of the adsorbent C receives a pressing force of the elastic body 25 from the above.

The tank port 20t of the canister 20 is connected to a cut-off valve 16 mounted to the ceiling portion of the fuel tank body 10m via the vapor pipe 15. The cut-off valve 16 is a valve that is closed by an overturning of a vehicle or the like and is typically held in an open state.

The purge port 20p of the canister 20 is connected to a tank side purge port 12p provided in the upper plate portion 12u of the fuel tank body 10m via a purge pipe 18t. In addition, an outside purge pipe 18p that is able to communicate with the intake pipe W of the engine E is connected to the tank side purge port 12p.

In addition, the atmosphere port 20a of the canister 20 is connected to a tank side atmosphere port 12a provided in the upper plate portion 12u of the fuel tank body 10m via an atmosphere pipe 19. In addition, the tank side atmosphere port 12a is open to the atmosphere.

<Joining of Upper Shell 12 and Lower Shell 14 of Fuel Tank 10>

The upper shell 12 including the canister 20 and the lower shell 14 to which the fuel pump unit 30 is mounted are joined by, for example, a hot plate welding method. That is, first, the joining surface of the flange portion 12f of the upper shell 12 is caused to come into contact with the upper surface of a flat hot plate (illustration is omitted) so as to be fused, and the joining surface of the flange portion 14f of the lower shell 14 is caused to come into contact with the lower surface of the iron plate so as to be fused. Next, the upper shell 12 and the lower shell 14 are removed from the hot plate, and the joining surface of the flange portion 12f of the upper shell 12 is aligned with the joining surface of the flange portion 14f of the lower shell 14. Accordingly, the upper shell 12 and the lower shell 14 are welded through the flange portions 12f and 14f thereof such that the fuel tank 20 is configured.

Here, procedures of causing the joining surfaces of the upper shell 12 and the lower shell 14 to come into contact with the hot plate so as to be fused may be simultaneously performed as described above, or any one may be performed first and the other may be performed later.

<Actions of Canister 20>

Next, the actions of the canister 20 in the fuel tank 10 according to this embodiment will be simply described.

In a stopped state of the engine E, for example, when the pressure in the fuel tank 10 becomes equal to or higher than a set pressure of the bidirectional check valve of the tank port 20t due to a temperature rise, the bidirectional check valve is opened. Accordingly, gas (fuel vapor+air) in the fuel tank 10 flows into the canister 20 through the cut-off valve 16, the vapor pipe 15, and the bidirectional check valve of the tank port 20t. The fuel vapor that flows into the canister 20 is adsorbed to the adsorbent C while flowing upward in the right passage T2, and the fuel vapor guided to the left passage T1 from the right passage T2 is further adsorbed to the adsorbent C while flowing downward in the left passage T1. In addition, air from which the fuel vapor is removed diffuses to the outside via the atmosphere pipe 19 and the tank side atmosphere port 12a of the fuel tank body 10m from the atmosphere port 20a. That is, as the air in the fuel tank body 10m is released to the outside, the pressure of the fuel tank body 10m is not increased to a predetermined value or higher, thereby achieving protection of the fuel tank body 10m.

Here, when the pressure in the fuel tank 10 is lower than the set pressure of the bidirectional check valve of the tank port 20t, the bidirectional check valve is closed, and thus the fuel vapor is sealed in the fuel tank 10 and does not leak out.

In addition, in the stopped state of the engine E, for example, when the pressure in the fuel tank 10 is reduced to be lower than a set negative pressure of the bidirectional check valve of the tank port 20t due to a temperature drop, the bidirectional check valve is opened. Accordingly, outside air is guided from the tank side atmosphere port 12a, the atmosphere pipe 19, and the atmosphere port 20a of the canister 20 into the canister 20 and thus flows into the fuel tank body 10m through the bidirectional check valve of the tank port 20t. That is, as air flows into the fuel tank body 10m from the outside, the pressure of the fuel tank body 10m is not reduced to the predetermined negative pressure or less, thereby achieving protection of the fuel tank body 10m.

Next, when the inside of the intake pipe W has a negative pressure due to driving of the internal combustion engine E, the inside of the canister 20 has a negative pressure via the outside purge pipe 18p, the tank side purge port 12p of the fuel tank body 10m, the purge pipe 18t, and the purge port 20p of the canister 20. Accordingly, air flows into the canister 20 from the tank side atmosphere port 12a, the atmosphere pipe 19, and the atmosphere port 20a of the canister 20, and the air flows upward in the left passage T1, reaches the right passage T2, flows downward in the right passage T2, and is taken into the intake pipe W of the engine E via the purge port 20p, the purge pipe 18t, the tank side purge port 12p, and the outside purge pipe 18p. In addition, the fuel vapor adsorbed to the adsorbent C is purged while the air flows into the right passage T2 from the left passage T1 so as to be desorbed from the adsorbent C, and the fuel vapor that is desorbed is supplied into the intake pipe W of the engine E along with the air.

That is, the lower end of the left passage T1 provided with the atmosphere port 20a of the canister 20 corresponds to one end side (upstream side) in the air flow direction of the passages in the present invention, and the lower end of the right passage T2 provided with the tank port 20t and the purge port 20p corresponds to the other end side (downstream side) in the air flow direction of the passages in the present invention.

<Advantages of Fuel Tank 10 according to this Embodiment>

According to the fuel tank 10 according to this embodiment, the atmosphere port 20a is provided on the one end side in the air flow direction of the passages T1 and T2 formed in the container 21 of the canister 20, and the tank port 20t is provided on the other end side in the air flow direction of the passages T1 and T2 together with the purge port 20p. That is, the tank port 20t is provided at the downstream end of the passages T1 and T2 together with the purge port 20p in the air flow direction.

Therefore, when a genitive pressure of the intake pipe W is applied to the purge port 20p due to operations of the engine E and the air that flows into the container 21 of the canister 20 from the atmosphere port 20a flows toward the other end side (the downstream side) from the one end side (the upstream end) of the passages T1 and T2, the air also flows to the vicinity of the tank port 20t. As a result, the adsorbent C disposed in the vicinity of the tank port 20t is also appropriately subjected to a purge, thereby eliminating a non-desorption region of fuel vapor in the canister 20.

Modification Example

Figure 2A:
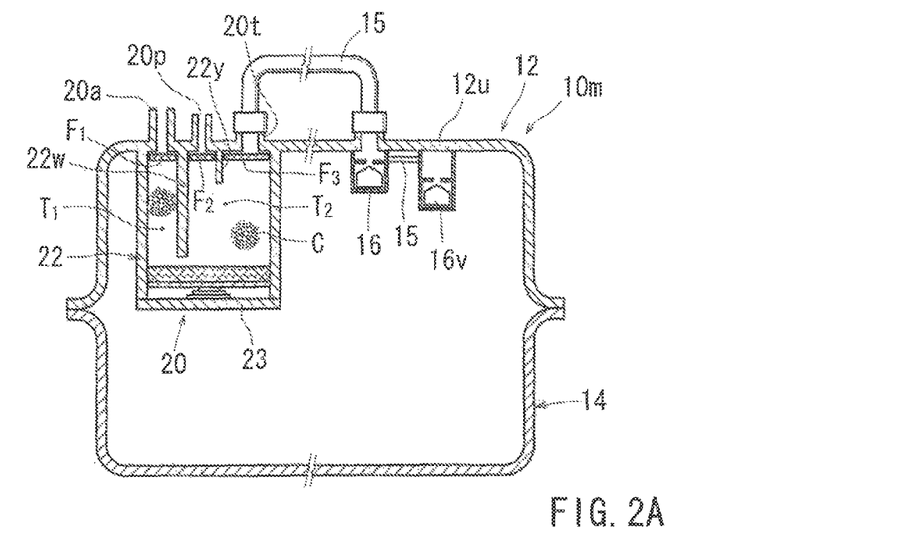
FIG. 2A illustrates a schematic diagram illustrating the configuration of a fuel tank according to a modification example of Embodiment 1.

Here, the present invention is not limited to the above-described embodiment, and may be modified in a scope that does not depart from the gist of the present invention. For example, in the fuel tank 10 according to this embodiment, an example in which the tank port 20t, the purge port 20p, and the atmosphere port 20a of the canister 20 are provided inside the fuel tank body 10m is illustrated. However, as illustrated in FIGS. 2A and 2B, it is possible to form the tank port 20t, the purge port 20p, and the atmosphere port 20a in the upper plate portion 12u of the fuel tank body 10m by modifying the container body 22 of the canister 20.

That is, the container body 22 of the canister 20 according to the modification example is a square container in which the upper end side (the upper plate portion 12u side of the fuel tank body 10m (the upper shell 12)) is closed and the lower end side is open, and is molded integrally with the upper shell 12. In the container body 22, the partition 22w is formed at the ceiling portion of the container body 22 to protrude downward in the fence shape, and the inside of the container body 22 is partitioned by the partition 22w to the left and the right excluding the vicinity of the lower portion opening 22h. That is, in the container body 22, the left passage T1 and the right passage T2 that communicate with each other at the lower portion are provided. In addition, the upper portion of the right passage T2 of the container body 22 is divided to the left and the right by the low vertical wall 22y formed to be parallel to the partition 22w.

In the ceiling plate (the upper plate portion 12u of the upper shell 12) of the container body 22, the atmosphere port 20a, the purge port 20p, and the tank port 20t are formed to protrude upward. That is, the atmosphere port 20a, the purge port 20p, and the tank port 20t are disposed on the outside of the fuel tank body 10m. In addition, the atmosphere port 20a communicates with the left passage T1 of the container body 22 via the first filter F1, and the purge port 20p communicates with the left of the vertical wall 22y in the right passage T2 of the container body 22 via the second filter F2. In addition, the tank port 20t communicates with the right of the vertical wall 22y in the right passage T2 of the container body 22 via the third filter F3.

Figure 2B:
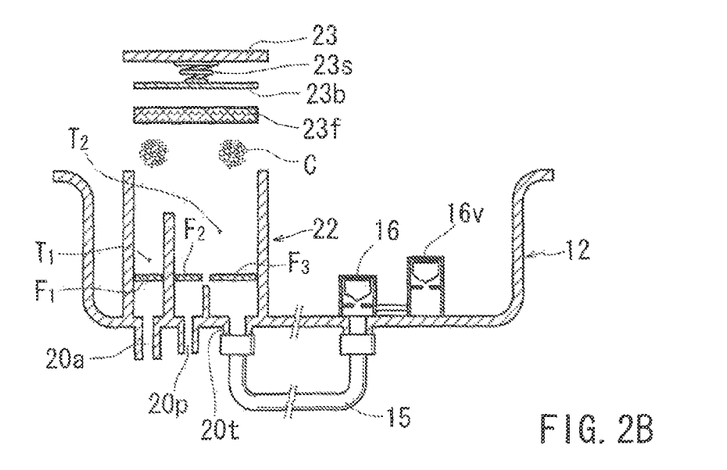
FIGS. 2B and 2C illustrate a longitudinal cross-sectional view illustrating a method of manufacturing a canister.

As illustrated in FIG. 2B, the left passage T1 and the right passage T2 of the container body 22 are filled with the adsorbent C after each of the first, second, and third filters F1, F2, and F3 is set from the lower portion opening 22h of the container body 22 in a state where the upper shell 12 is vertically reversed. In addition, in a state where the adsorbent C is filled in the container body 22, the entire upper surface of an aggregated part of the adsorbent C (the entirety of the upper surface in FIG. 2B is covered with a filter 23f, and the filter 23f is pressed by a pressing flat plate 23b. Moreover, in a state where a spring 23s is set between the pressing plate 23b and the cover material 23, the peripheral edge of the cover material 23 is joined to the peripheral edge of the lower portion opening 22h of the container body 22. Accordingly, the aggregation part of the adsorbent C receives a pressing force from the above due to the action of the spring 23s.

The canister 20 (see FIG. 2A) according to this modification example has substantially the same configuration as that of the canister 20 illustrated in FIG. 1A and is different only in the positions of the atmosphere port 20a, the purge port 20p, and the tank port 20t, and thus description of the operations of the canister 20 according to this modification example will be omitted.

In addition, in the fuel tank according to the modification example, the bidirectional check valve in the tank port 20t of the canister 20 is omitted, and thus a fill-up regulating valve 16v is provided at the tip position of the vapor pipe 15 as illustrated in FIGS. 2A and 2. Here, the fill-up regulating valve 16v is a valve that prevents a fuel liquid level in the fuel tank body 10m from exceeding the upper limit value during fueling, and is held in a closed state when the fuel tank is filled up and held in an open state except when the fuel tank is filled up.

Figure 2C:
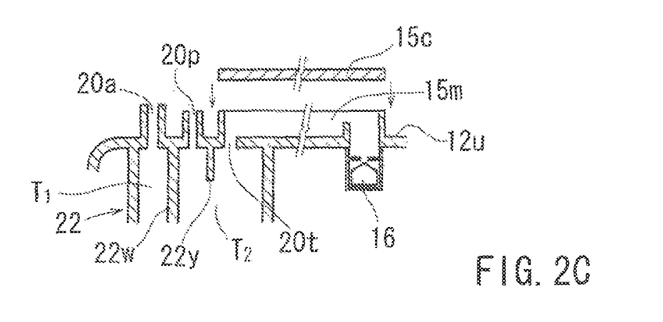

In addition, in FIGS. 2A and 2B, an example in which the tank port 20t and the cut-off valve 16, and the cut-off valve 16 and the fill-up regulating valve 16v are connected with the vapor pipe 15 is illustrated. However, as illustrated in FIG. 2C, a groove portion 15m that connects the tank port 20t to the cut-off valve 16 and connects the cut-off valve 16 to the fill-up regulating valve 16v may be formed in the upper plate portion 12u of the upper shell 12, and a vapor passage may be formed by covering the opening portion of the groove portion 15m with a cover portion 15c. Accordingly, a part (the groove portion 15m) of the vapor passage may be molded integrally with the upper shell 12, resulting reduction in cost.

Figure 3A:
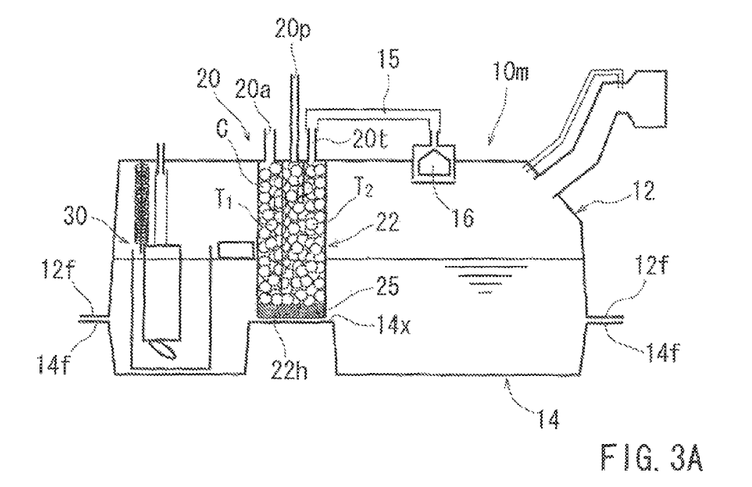
FIGS. 3A and 3B illustrates schematic longitudinal cross-sectional views illustrating a method of manufacturing a fuel tank according to the modification example of Embodiment 1.

In the fuel tank according to the modification example of FIGS. 2A to 2C, an example in which the lower portion opening 22h of the container body 22 of the canister 20 is covered by the cover material 23 is illustrated. However, as illustrated in FIG. 3A, the lower portion opening 22h of the container body 22 may be covered by a flat portion 14x formed in the lower shell 14.

That is, the container body 22 of the canister 20 formed in the upper shell 12 is formed to be vertically long, and the lower end surface of the container body 22 is positioned on the same plane as the joining surface of the flange portion 12f of the upper shell 12.

In addition, in the lower shell 14, a square protrusion is formed at a position corresponding to the container body 22 of the canister 20, and the upper surface of the protrusion becomes the flat portion 14x which is flat. In addition, the flat portion 14x of the protrusion is positioned on the same plane as the joining surface of the flange portion 14f of the lower shell 14.

Therefore, the container body 22 of the canister 20 is filled with the adsorbent C, and in a state where the lower portion opening 22h of the container body 22 is temporarily blocked by an elastic body 25 (for example, urethane, rubber, or the like), the upper shell 12 and the lower shell 14 may be joined by, for example, a hot plate welding method.

That is, first, the joining surface of the flange portion 12f of the upper shell 12 and the lower end surface of the container body 22 are caused to come into contact with the upper surface of a flat hot plate (illustration is omitted) so as to be fused, and the joining surface of the flange portion 14f of the lower shell 14 and the flat portion 14x of the protrusion are caused to come into contact with the lower surface of the iron plate so as to be fused. Next, the upper shell 12 and the lower shell 14 are removed from the hot plate, and the joining surface of the flange portion 12f of the upper shell 12 is aligned with the joining surface of the flange portion 14f of the lower shell 14, and the lower end surface of the container body 22 of the upper shell 12 is aligned with the flat portion 14x of the protrusion of the lower shell 14. Accordingly, the flange portion 12f of the upper shell 12 and the flange portion 14f of the lower shell 14 are welded to each other, and the lower portion opening 22h of the container body 22 and the flat portion 14x of the protrusion are welded to each other, thereby blocking the lower portion opening 22h of the container body 22. In this manner, the lower portion opening 22h of the container body 22 may be blocked simultaneously with joining between the flange portion 12f of the upper shell 12 and the flange portion 14f of the lower shell 14, and thus molding of the fuel tank body 10m and the molding of the canister 20 may be simultaneously performed.

Figure 3B:
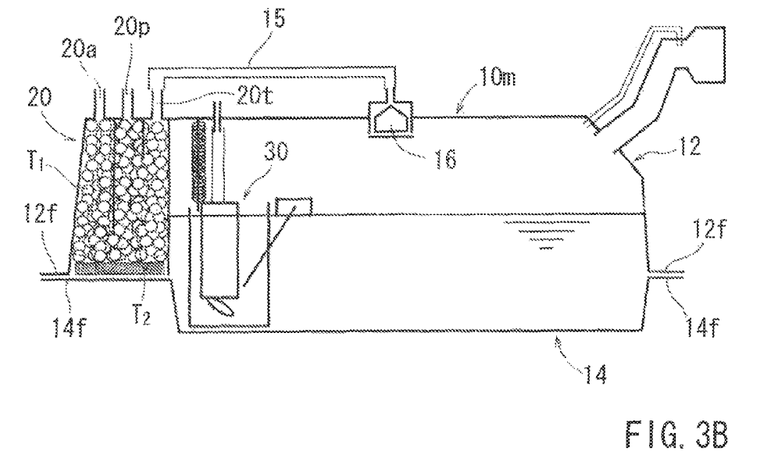

In addition, as illustrated in FIG. 3B, by disposing the canister 20 at the end portion of the fuel tank body 10m, the lower portion opening 22h of the container body 22 of the canister 20 may be blocked by the flange portion 14f of the lower shell 14.

Embodiment 2

Figure 4A:
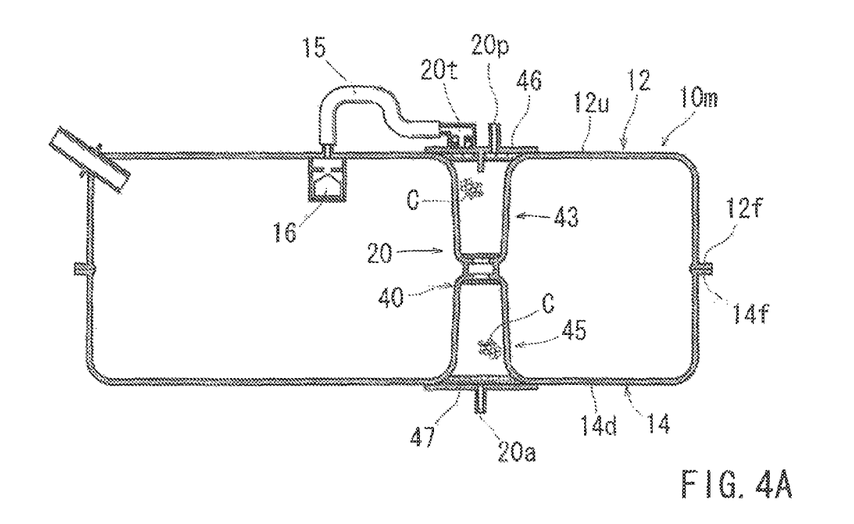
FIG. 4A illustrates a schematic diagram illustrating the configuration of a fuel tank according to Embodiment 2 of the present invention.
Figure 4B:
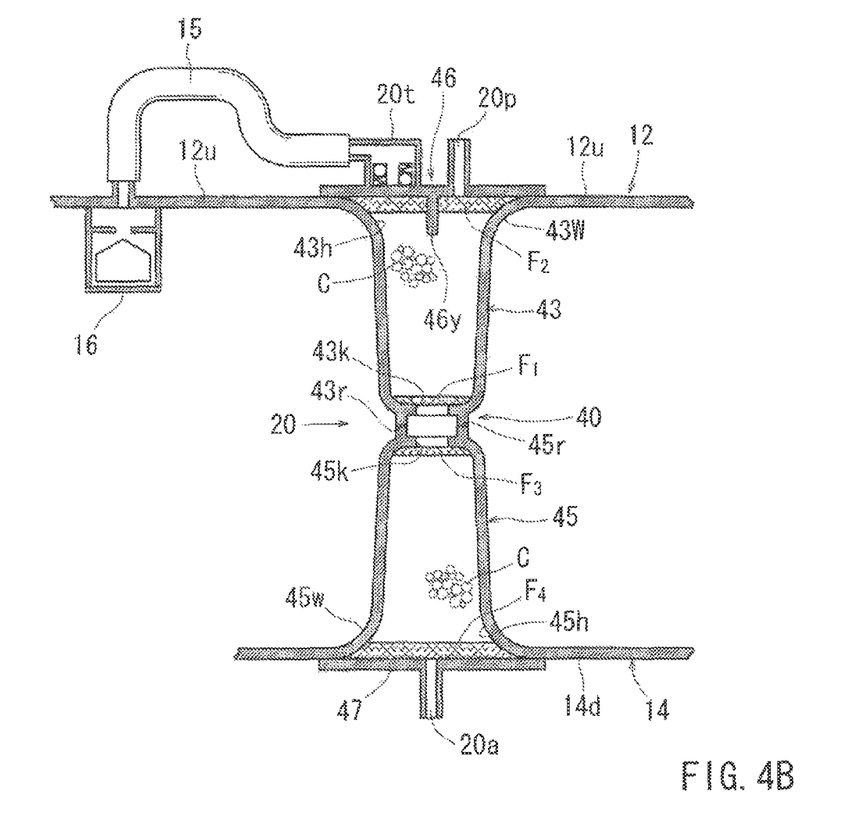
FIG. 4B illustrates an enlarged diagram of a canister part of FIG. 4(A).

Hereinafter, description of a fuel tank according to Embodiment 2 of the present invention will be provided on the basis of FIGS. 4A and 4B. The fuel tank according to this embodiment is made by changing the shapes and the like of the container body 22 of the canister 20 according to Embodiment 1, and the configurations other than the container body 22 are the same as the configurations of the fuel tank 10 according to Embodiment 1. Therefore, in the fuel tank according to this embodiment, like elements that are the same as those of the fuel tank 10 according to Embodiment 1 are denoted by like reference numerals, and description thereof will be omitted.

<Container Upper Side Portion 43 of Container Body 40>

A container upper side portion 43 that is included in a container body 40 of the canister 20 is formed in the upper shell 12 included in the fuel tank body 10m of the fuel tank according to this embodiment. The container upper side portion 43 is a portion that is molded integrally with the upper shell 12 and is formed in a substantially cylindrical shape. In addition, an upper end portion 43w of the container upper side portion 43 expands in a funnel shape, and the peripheral edge portion thereof is configured to be continuous from the upper plate portion 12u of the upper shell 12. In addition, a through-hole 43k is formed at the center of the bottom portion of the container upper side portion 43, and a joint ring portion 43r is formed on the lower side of the bottom portion coaxially with the through-hole 43k to surround the through-hole 43k. In addition, the lower end surface of the joint ring portion 43r of the container upper side portion 43 is positioned on the same plane as the joining surface (lower end surface) of the flange portion 12f of the upper shell 12.

The filter F1 is set in the container upper side portion 43 to cover the through-hole 43k at the bottom portion, and the upper side of the filter F1 is filled with the adsorbent C. In addition, in a state where the filter F2 covers the upper surface of an aggregated part of the adsorbent C, an upper portion opening 43h of the container upper side portion 43 is blocked by an upper portion cover material 46.

In the upper portion cover material 46, the tank port 20t and the purge port 20p are formed to protrude outward from the fuel tank body 10m. In addition, on the inner side of the upper portion cover material 46, a vertical wall 46y that is formed to be distant from the tank port 20t and the purge port 20p on the inner side of the container upper side portion 43 is formed.

<Container Lower Side Portion 45>

A container lower side portion 45 that is included in the container body 40 of the canister 20 is formed in the lower shell 14 included in the fuel tank body 10m. The container lower side portion 45 is formed to be vertically symmetrical to the container upper side portion 43 of the upper shell 12. That is, a lower end portion 45w of the container lower side portion 45 expands in a funnel shape, and the peripheral edge portion thereof is configured to be continuous from the bottom plate portion 14d of the lower shell 14. In addition, a through-hole 45k is formed at the center of the ceiling portion of the container lower side portion 45, and a joint ring portion 45r is formed on the upper side of the ceiling portion coaxially with the through-hole 43k to surround the through-hole 45k. In addition, the upper end surface of the joint ring portion 45r of the container lower side portion 45 is positioned on the same plane as the joining surface (upper end surface) of the flange portion 14f of the lower shell 14.

The filter F3 is set in the container lower side portion 45 to cover the through-hole 45k at the ceiling portion from the inside, and the inside of the container lower side portion 45 is filled with the adsorbent C. In addition, in a state where a filter F4 covers an aggregated part of the adsorbent C, a lower portion opening 45h of the container lower side portion 45 is blocked by a lower portion cover material 47.

In the lower portion cover material 47, the atmosphere port 20a is formed to protrude outward from the fuel tank body 10m.

<Method of Manufacturing Fuel Tank 10>

First, the container upper side portion 43 of the upper shell 12 side is filled with the adsorbent C as described above, and the upper portion opening 43h of the container upper side portion 43 is closed by the upper portion cover material 46. In addition, the container lower side portion 45 of the lower shell 14 side is similarly filled with the adsorbent C, and the lower portion opening 45h of the container lower side portion 45 is closed by the lower portion cover material 47. Next, the upper shell 12 and the lower shell 14 are joined by, for example, a hot plate welding method. That is, first, the joining surface of the flange portion 12f of the upper shell 12 and the lower end surface of the joint ring portion 43r of the container upper side portion 43 are caused to come into contact with the upper surface of a flat hot plate (illustration is omitted) so as to be fused, and the joining surface of the flange portion 14f of the lower shell 14 and the upper end surface of the joint ring portion 45r of the container lower side portion 45 are caused to come into contact with the lower surface of the iron plate so as to be fused. Next, in a state where the upper shell 12 and the lower shell 14 are removed from the hot plate, the joining surface of the flange portion 12f of the upper shell 12 is aligned with the joining surface of the flange portion 14f of the lower shell 14, and the lower end surface of the joint ring portion 43r of the container upper side portion 43 is aligned with the upper end surface of the joint ring portion 45r of the container lower side portion 45. Accordingly, the flange portion 12f of the upper shell 12 and the flange portion 14f and the lower shell 14 are fused to each other, and the lower end surface of the joint ring portion 43r of the container upper side portion 43 and the upper end surface of the joint ring portion 45r of the container lower side portion 45 are fused to each other. That is, the fuel tank body 10m is constituted by the upper shell 12 and the lower shell 14, and the canister 20 is simultaneously formed by the container upper side portion 43 and the container lower side portion 45.

<Advantages of Fuel Tank According to this Embodiment>

According to the fuel tank according to this embodiment, the container body 40 of the canister 20 is formed to vertically traverse the space in the fuel tank body 10m, and a wall portion (the lower portion cover material 47) provided with the atmosphere port 20a and a wall portion (the upper portion cover material 46) provided with the tank port 20t and the purge port 20p oppose each other with the fuel tank body 10m interposed therebetween.

Therefore, the fuel tank body 10m may be reinforced from the inside by using the container body 40 of the canister 20.

Embodiment 3

Hereinafter, description of a fuel tank according to Embodiment 3 of the present invention will be provided on the basis of FIGS. 5A, 5B and 6. The fuel tank according to this embodiment is made by changing the container bodies 22 and 40 of the canister 20 according to Embodiments 1 and 2 so that a container body 50 is formed to be thin and long on the upper surface of the fuel tank body 10m as illustrated in FIG. 5B. In addition, in the fuel tank according to this embodiment, the configurations other than the container body 50 are the same as those of the fuel tank 10 according to Embodiment 1. Therefore, like elements that are the same as those of the fuel tank 10 according to Embodiment 1 are denoted by like reference numerals, and description thereof will be omitted.

As illustrated in FIG. 5B, the container body 50 of the canister 20 according to this embodiment is formed in a groove shape that gradually meanders on the upper surface of the fuel tank body 10m (the upper shell 12) and is molded integrally with the upper shell 12. The inside of the container body 50 is partitioned by an first partition plate portion 51 that is provided in the vicinity of one end side in the longitudinal direction (in the vicinity of the left end in FIGS. 5A, 5B and 6) and has air permeability and a second partition plate portion 52 that is provided in the vicinity of the other end side (in the vicinity of the right end in FIGS. 5A, 5B and 6) and has air permeability into a left end chamber R1, a passage T, and a right end chamber R2. As illustrated in FIG. 6, a first filter 51f is provided on the passage T side of the first partition plate portion 51, and a second filter 52f is provided on the passage T side of the second partition plate portion 52. In addition, the passage T of the container body 50 is filled with the adsorbent C at a position between the first and second filters 51f and 52f. In a state where the upper surface of the aggregated part of the adsorbent C that fills the passage T of the container body 50 is covered with an elastic body 53 (for example, urethane, rubber, or the like), an upper portion opening 50h (see FIG. 5B) of the container body 50 is blocked by a cover material 55.

Here, a material having a sufficiently greater ventilation resistance than the ventilation resistance of the aggregated part of the adsorbent C that fills the passage T is used for the elastic body 53. Therefore, air or the like that flows in the passage T of the container body 50 does not flow along a part of the elastic body 53 and mainly passages through a part of the adsorbent C.

Figure 5A:
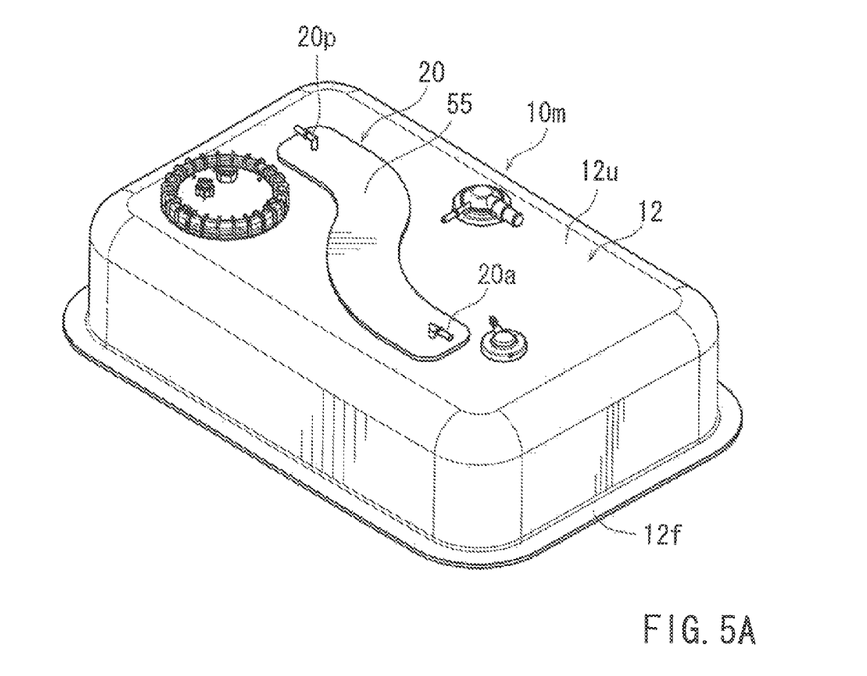
FIGS. 5A and 5B illustrates perspective views illustrating a fuel tank body (upper shell) of a fuel tank according to Embodiment 3 of the present invention.
Figure 5B:
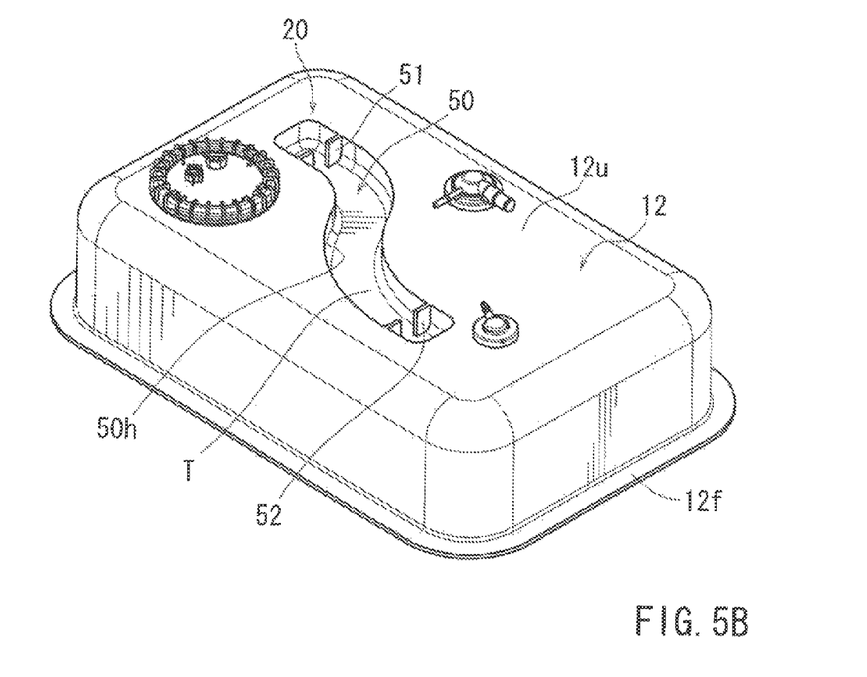

As described above, the cover material 55 is a flat plate that blocks the upper portion opening 50h of the container body 50, and as illustrated in FIG. 5A, is molded in a shape that gradually meanders similarly to the container body 50. The purge port 20p is provided in the left end portion of the surface of the cover material 55, and the atmosphere port 20a is formed in the right end portion of the surface of the cover material 55. In addition, in a state where the cover material 55 blocks the upper portion opening 50h of the container body 50, as illustrated in FIG. 6, the atmosphere port 20a communicates with the right end chamber R2 of the container body 50, and the purge port 20p communicates with the left end chamber R1 of the container body 50. In addition, as illustrated in FIG. 6, the left end chamber R1 of the container body 50 is able to communicate with the tank port 120t via a bidirectional check valve 56.

In the above-described canister 20, when a negative pressure is applied to the purge port 20p by driving of the engine E, air flows into the right end chamber R2 of the container body 50 from the atmosphere port 20a, and the air flows to the left in the passage T and is taken into the intake pipe W of the engine E from the left end chamber R1 and the purge port 20p. In addition, fuel vapor that is adsorbed to the adsorbent C is desorbed from the adsorbent C while the air flows to the left in the passage T, and the fuel vaport that is desorbed is supplied into the intake pipe W of the engine E along with the air. As described above, for the elastic body 53 that presses the adsorbent C from the above the material having a sufficiently greater ventilation resistance than the ventilation resistance of the aggregated part of the adsorbent C that fills the passage T is used. Therefore, the air and the like that flows in the passage T of the container body 50 does not pass through a part of the elastic body 53 and mainly passes through a part of the adsorbent C. Therefore, even though the passage T is formed to be log, an efficiency of the fuel vapor being desorbed from the adsorbent C is not reduced.

That is, even when the length dimension of the groove-shaped container body 50 is large, the adsorbent C may be appropriately subjected to the purge, and thus the length dimension may be increased. In addition, the depth dimension of the container body 50 may be reduced by an increase in the length dimension of the container body 50. Therefore, the dimensions of the canister protruding toward the internal space of the fuel tank body 10m may be reduced.

Modification Example

Figures 7A, 7B:
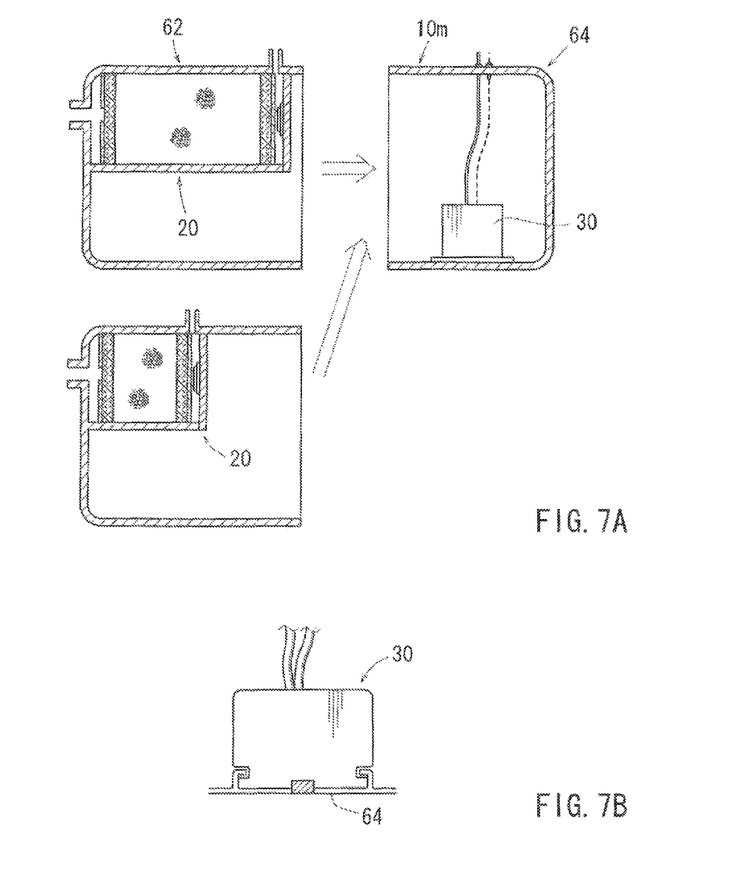
FIG. 7A illustrates a schematic longitudinal cross-sectional view illustrating a method of manufacturing a fuel tank according to a modification example.
FIG. 7B illustrates a mounting diagram of a fuel pump unit (FIG. 7(B))

Here, the present invention is not limited to Embodiments 1, 2, and 3 described above, and may be modified in a scope that does not depart from the gist of the present invention. For example, in Embodiments 1, 2, and 3, an example in which the fuel tank body 10m is constituted by the upper shell 12 and the lower shell 14 is illustrated. However, as illustrated in FIG. 7A, the fuel tank body 10m may also be constituted by a left shell 62 to which the canister 20 is mounted and a right shell 64 to which the fuel pump unit 30 is mounted. Here, it is preferable that a plurality of kinds of left shells 62 be prepared depending on the size of the canister 20 and the right shell 64 be used in common. In addition, a configuration in which horizontal position adjustment of the fuel pump unit 30 is possible to fit the size of the fuel tank body 10m as illustrated in FIG. 7B is preferable.

Figure 7C:
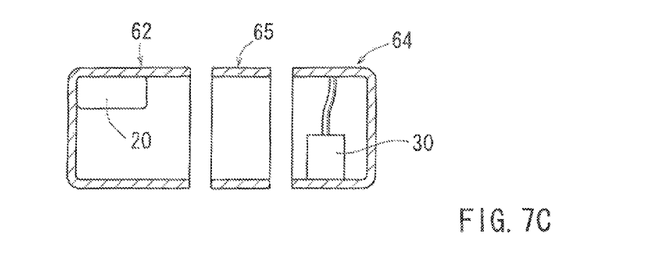
FIG. 7C illustrates a schematic longitudinal cross-sectional view of the fuel tank (FIG. 7(C)).

In addition, as illustrated in FIG. 7C, the fuel tank body 10m may also be configured by a left shell 62, an intermediate shell 65, and a right shell 64.

In addition, in FIGS. 1A and 1B of Embodiment 1 of the present invention, an example in which the adsorbent C that fills the container body 22 of the canister 20 is pressed by using the elastic force of the plate-like elastic body 25 is illustrated. However, as illustrated in FIG. 2A, a configuration in which pressing is achieved by the pressing flat plate 23b and the spring 23s is also possible. Contrary to this, as illustrated in FIG. 2A, instead of pressing the adsorbent C that fills the container body 22 with the pressing flat plate 23b and the spring 23s, a configuration in which pressing is achieved by using the elastic force of the elastic body 25 is also possible.

The invention claimed is:

1. A fuel tank having a configuration in which a fuel tank body that stores fuel and a container body of a canister that stores an adsorbent to which fuel vapor is able to be adsorbed are integrally molded, the fuel tank comprising:
    a first shell; and
    a second shell coupled to the first shell;
    wherein a container of the canister is formed by the container body and a cover material;
    wherein the container includes a tank port that communicates with a space in the fuel tank body, a purge port that is able to communicate with an intake passage of an engine, and an atmosphere port that is able to communicate with atmosphere;
    wherein:
        an inside of the container is configured to be partitioned to form a flow passage that is filled with the adsorbent, the flow passage including an air flow direction;
        the atmosphere port is provided at an upstream end side of the flow passage with respect to the air flow direction, and the tank port and the purge port are each provided at a downstream end side of the flow passage with respect to the air flow direction;
        the first shell forms at least a part of the container body of the canister and a first part of the fuel tank body; and
        the second shell forms a second part of the fuel tank body.

2. The fuel tank according to claim 1,
    wherein the atmosphere port, the tank port, and the purge port are disposed inside the fuel tank body.

3. The fuel tank according to claim 1,
    wherein the atmosphere port, the tank port, and the purge port are disposed outside the fuel tank body.

4. The fuel tank according to claim 3,
    wherein the container body of the canister is formed to traverse the space in the fuel tank body, and
    a wall portion provided with the atmosphere port and a wall portion provided with the tank port and the purge port oppose each other with the fuel tank body interposed therebetween.

5. The fuel tank according to claim 4,
    wherein a vapor passage that causes the tank port of the canister and the space in the fuel tank body to communicate with each other is constituted by a wall surface of the fuel tank body and a cover member that covers the wall surface.

6. The fuel tank according to claim 1,
    wherein the container of the canister is constituted by a groove-shaped container body formed on an upper surface of the fuel tank body and a cover material that blocks the groove-shaped container body,
    one end side and the other end side in a longitudinal direction of the groove-shaped container body respectively correspond to the upstream end side and the downstream end side in the air flow direction of the passages,
    an elastic body that presses the adsorbent is disposed between the adsorbent that fills the container body and the cover material, and
    a ventilation resistance of the elastic body is set to be greater than a ventilation resistance of an aggregated part of the adsorbent.

7. A method of manufacturing the fuel tank according to claim 1, comprising:
    a step of integrally molding any one of an upper shell and a lower shell that constitute the fuel tank body, and the container body of the canister;
    a step of integrally molding the other of the upper shell and the lower shell, and the cover material of the container body of the canister;
    a filling step of filling the container body of the canister with the adsorbent of fuel vapor; and
    a step of joining the upper shell to lower shell after the filling step, and joining the container body of the canister to the cover material.

8. The fuel tank according to claim 3,
    wherein a vapor passage that causes the tank port of the canister and the space in the fuel tank body to communicate with each other is constituted by a wall surface of the fuel tank body and a cover member that covers the wall surface.

* * * * *